March 2, 1954 R. E. GRAHAM ET AL 2,671,133

VERTICAL SYNCHRONIZING GENERATOR

Filed Aug. 10, 1951

3 Sheets-Sheet 1

INVENTORS: R.E. GRAHAM
C.W. HARRISON
BY Hugh S. Wertz
ATTORNEY

March 2, 1954
R. E. GRAHAM ET AL
VERTICAL SYNCHRONIZING GENERATOR
2,671,133
Filed Aug. 10, 1951
3 Sheets-Sheet 2

INVENTORS: R. E. GRAHAM
C. W. HARRISON
BY Hugh S. Wertz
ATTORNEY

March 2, 1954 R. E. GRAHAM ET AL 2,671,133

VERTICAL SYNCHRONIZING GENERATOR

Filed Aug. 10, 1951

3 Sheets-Sheet 3

INVENTORS: R. E. GRAHAM
C. W. HARRISON

BY Hugh S. Wertz

ATTORNEY

Patented Mar. 2, 1954

2,671,133

UNITED STATES PATENT OFFICE 2,671,133

VERTICAL SYNCHRONIZING GENERATOR

Robert E. Graham, Chatham, and Charles W. Harrison, Gillette, N. J., assignors to Bell Telephone Laboratories, Incorporated, New York, N. Y., a corporation of New York Application August 10, 1951, Serial No. 241,243

2 Claims. (Cl. 178—69.5)

This invention relates to synchronizing systems. More particularly it concerns synchronizing systems which make use of composite signals having different frequency components for transmission of the synchronizing information, as, for example, the standard RMA television synchronizing system which utilizes composite signals, comprising relatively short horizontal or line synchronizing pulses interposed with relatively longer serrated vertical or field synchronizing pulses, to control the vertical and horizontal sweep generators at the receiver for providing synchronization with the scanning process at the transmitter.

An object of this invention is to improve the synchronization in systems which use composite synchronizing signals.

It will be convenient for purposes of analysis to describe the present invention specifically with reference to a standard RMA television synchronizing system, but it will be evident that the invention is not necessarily limited thereto.

In a typical television system, the basic arrangement for separating the horizontal and vertical synchronizing signals from the composite synchronizing information includes a differentiating circuit to which the composite signal is supplied for separating out the shorter line synchronizing pulses and an integrating circuit to which the composite signal is supplied for separating out the longer field synchronizing pulses. For effecting this separation, the integrating circuit is characterized by leakage sufficient for eliminating the effect of the short horizontal synchronizing pulses but insufficient to prevent the accumulation of charge during the longer field synchronizing pulses. Some point, usually about half the expected cumulative amplitude, is made the operating point for triggering the field sweep generator. The triggering time then coincides with the accumulation of the charge in the integrating circuit to this chosen operating amplitude.

However, this simple arrangement has for some time past been known to be not too well adapted for conventional interlaced scanning systems since interlacing results in non-uniformity between the even- and odd-numbered fields by each television frame in the region of the vertical synchronizing pulses. This non-uniformity, in turn, leads to different triggering times as measured from the start of the field synchronizing pulse for two successive fields, and hence, uneven and inaccurate interlacing. To minimize the difference in wave form in the region of the vertical synchronizing pulse for even- and odd-numbered scanning fields, it is now the practice to insert equalizing pulses at half-line intervals, for a time before and after the field synchronizing pulses, so that in this region successive fields are made to be alike. Although this is, in general, satisfactory, for high fidelity receivers it is usually necessary to resort to still more sophisticated arrangements to obtain the desired degree of accuracy in timing. The present invention is concerned with this problem.

To this end, the separation of the field synchronizing information is achieved by an arrangement in which the composite signal is applied to a frequency sensitive circuit, or filter network, for effecting a displacement in amplitude levels of the vertical and horizontal synchronizing pulses; and thereafter the filtered output is clipped at a level which isolates the vertical synchronizing information. In one specific embodiment, the desired high pass filtering is achieved by applying the input composite signal to a low pass filter having an upper frequency cut-off below the frequency of the line synchronizing pulses, but above the frequency of the field synchronizing pulses, and then subtracting the filter output derived from the original input composite signal.

The invention will be better understood with reference to the following more detailed description taken in connection with the accompanying drawings in which.

Figure 1:
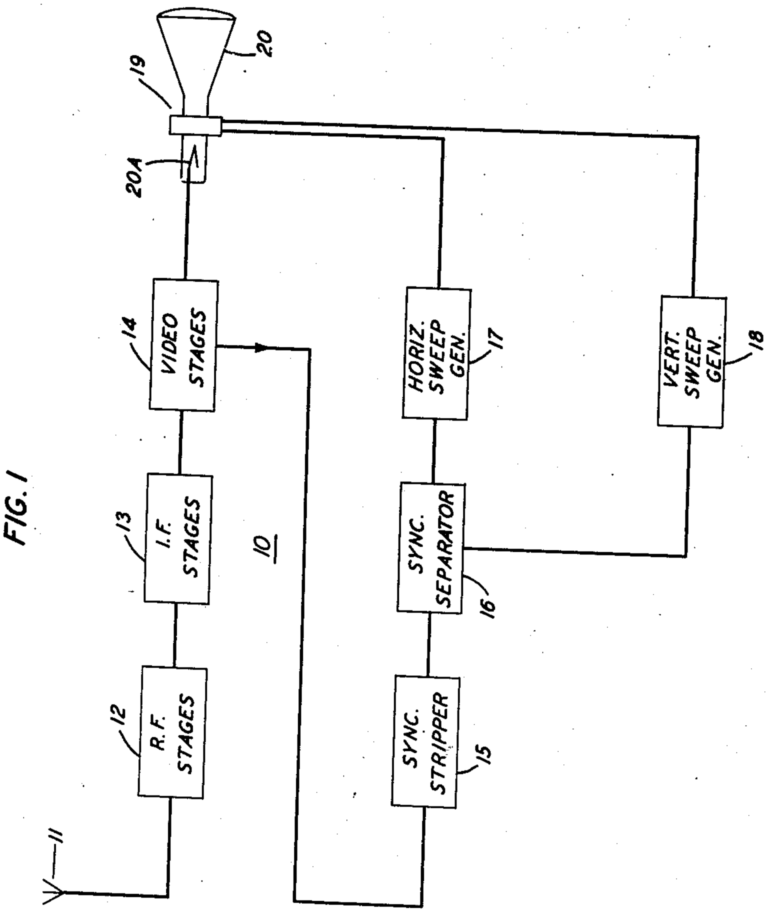
Fig. 1 shows in block schematic form the circuitry of a typical television receiver.
Figures 4A, 4B, 4C, 4D, 4E, 4F, 4G:
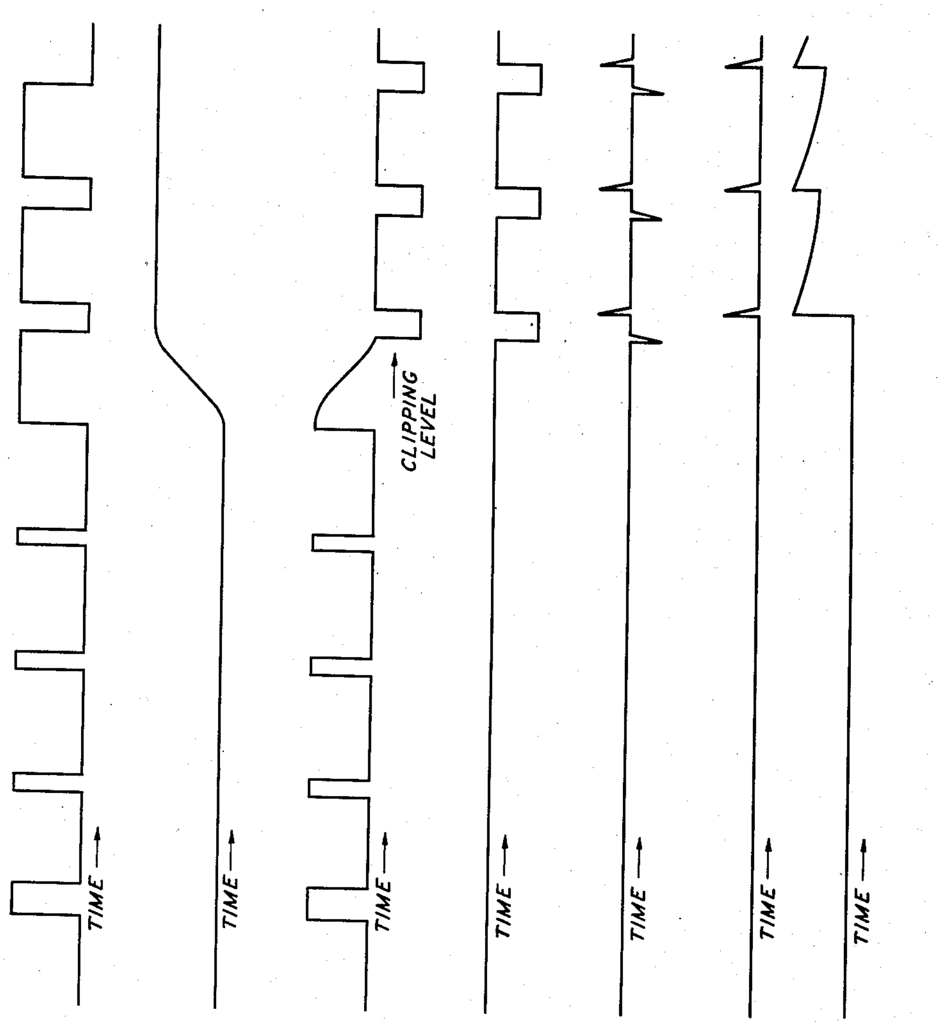
Figs. 4A to 4G, inclusive, show wave forms that are useful in describing the embodiment shown in Fig. 2.

Referring now more particularly to the drawings, in Fig. 1 there is shown schematically a typical television receiver 10. The transmitted radio frequency television signal is received by the antenna 11 and, thereafter, in the radio frequency stages 12 it is amplified and converted to an intermediate frequency. In the intermediate frequency stages 13, this intermediate frequency signal is amplified further, and the video signal is detected therefrom. In the video stages 14, this signal is again amplified. At this point, the video signal includes both the picture and synchronizing information. Because it is usual to include the synchronizing information at amplitude levels which will not affect the picture on the viewing screen, the video signal can be applied directly to the intensity control element 20A of the viewing tube 20. However, for the recovery of the synchronizing information, it is first necessary to eliminate the picture signal, and so the video signal is applied to a synchronizing stripper 15 which removes the picture information and leaves only the synchronizing information. This synchronizing information is a composite signal which comprises a series of horizontal synchronizing pulses recurring at line frequency interspersed with a series of serrated vertical synchronizing pulses recurring at field frequency. The wave form of a portion of this composite signal is shown in Fig. 4A. This composite signal is thereafter applied to a synchronizing separator 16 which separates out the horizontal and vertical synchronizing pulses. These in turn are applied to the horizontal and vertical sweep generators 17 and 18, respectively, for providing the deflecting sweep signals which are applied to the appropriate deflecting means 19 of the viewing tube 20. The present invention is primarily concerned with improving the control of the sweep generators, more particularly the vertical sweep generator, and to this end provides an improved synchronizing separator arrangement which permits more accurate timing of the vertical sweep generator. The rest of the receiver may be as found in the typical commercial receiver.

Figure 2:
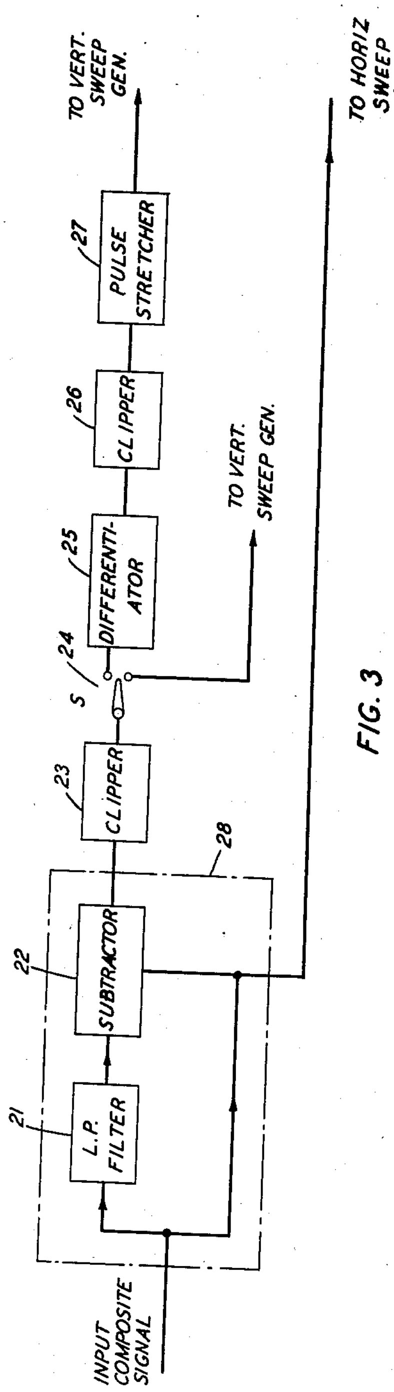
Fig. 2 shows in block schematic form a specific embodiment of a synchronizing separator in accordance with the present invention.

Fig. 2 shows, in block schematic, a preferred embodiment of the invention, which will be described in connection with the wave forms shown in Figs. 4A to 4G, inclusive. The composite signal whose wave form is shown in Fig. 4A is applied to a low pass filter 21 which is designed to have an upper cut-off frequency below the line recurrent frequency so that effectively the short line pulses are filtered out while the longer field pulses are smoothed of their serrations. Accordingly, there is derived a signal having the wave form shown in Fig. 4B. This filter output is subtracted from the composite input signal in a subtractor 22 and the resultant therefrom has the serrated wave form shown in Fig. 4C. It can be seen that at this point there has been effected a displacement in amplitude level between the line and field synchronizing pulses. It should be appreciated that the arrangement 28 shown within the dashed lines is a special form of high pass filter, which has a low frequency cut-off less than the line recurrent frequency but above the field recurrent frequency, and accordingly, it is possible to devise other filter arrangements which provide amplitude displacement in this fashion. This special form of filter, which is a feature of the present invention, however, has been found to offer advantages of simplicity of structure and reliability of operation. Thereafter the output of the subtractor is applied to a clipper 23 whose level is adjusted to pass only the negative pulses which correspond to serrations in the vertical synchronizing pulses of the original input signal. The output therefrom, whose wave form is shown in Fig. 4D, now includes only vertical synchronizing information. This information comprises a series of negative pulses each of which corresponds to a serration in the vertical synchronizing pulses of the original input composite signal. These pulses can in some instances be used directly to control a vertical sweep generator and, accordingly, by setting the switch S (designated 24) at position 2, there can be derived a series of pulses suitable for control of a vertical sweep generator. Usually, however, it will be preferable to transform this synchronizing information to a form better suited for control of the vertical sweep generator. In such a case, corresponding to setting 1 of the switch S, this series of pulses is applied to a differentiator 25, and there will then be derived a series of short negative and positive pulses, corresponding, respectively, to the trailing and leading edges of the output of clipper 23. This action is illustrated in Fig. 4E. Of this series, either the positive or negative pulses can be used directly to control various suitable forms of vertical sweep generators. Additionally, for control of sweep generators of the kind which utilizes a relatively long pulse rather than a series of short pulses, the output of differentiator 25 is applied to a second clipper 26, adjusted to pass only unidirectional pulses, for example, positive pulses as illustrated in Fig. 4F. Then by applying these pulses to pulse stretching means 27, there is obtained the relatively long pulse shown in Fig. 4G.

Figure 3:
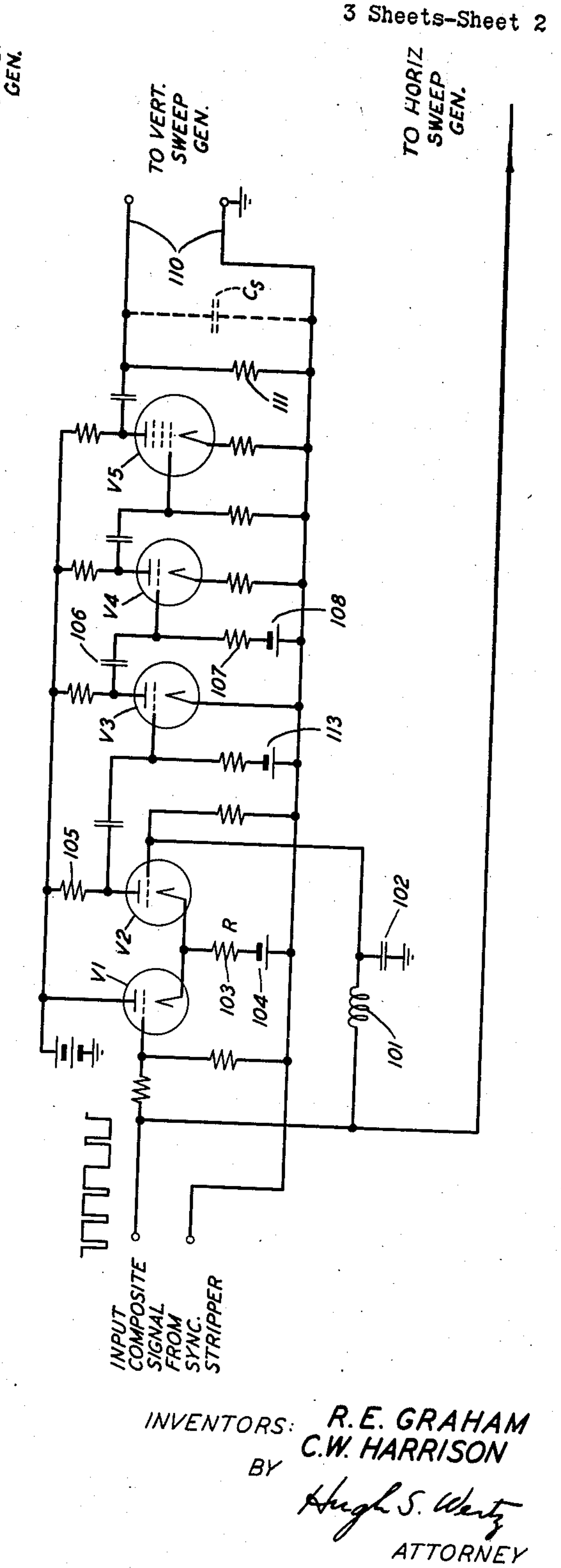
Fig. 3 shows in schematic circuit form the synchronizing separator shown in Fig. 2.

Fig. 3 shows in circuit schematic form an illustrative embodiment of the synchronizing separator shown in Fig. 2 represented by the upper setting of the switch S. The composite input signal which has the wave form shown in Fig. 4A, except that the polarities are reversed, is applied from the synchronizing stripper 15 by way of the low pass filter comprising the series inductance 101 and the shunt capacitance 102 to the control grid of the tube V2 which together with the tube V1 forms a differential amplifier or subtractive network. The input composite signal is simultaneously applied to the control grid of the tube V1. The differential amplifier which comprises the tube V1 and V2 is designed to provide an output which is the arithmetic difference of the signals applied to its two input control grids. To obtain this differential action, the cathodes of tubes V1 and V2 are coupled together and connected through the resistance R (designated 103) to the negative terminal of potential source or battery 104 and the value of resistance R is chosen so that $$R \gg \frac{1}{g_m}$$

where $g_m$ is the transconductance of each of the tubes V1 and V2. The resultant output is derived across resistance 105 in the plate circuit of tube V2, and has the wave forms shown in Fig. 4C except that the polarities are reversed. This output is then clipped or rectified by the action of amplifier tube V3, whose control grid to which this output is applied is biased negative by voltage source 113. As a result, only positive pulses will be amplied. Accordingly clipping occurs and the output of tube V3 is a signal which has the wave form shown in Fig. 4D. As has been mentioned above, this signal can be used directly for the control of the vertical sweep generator if so desired. It can be seen that the synchronizing pulses shown in Fig. 4D correspond quite precisely to the serrations in the vertical synchronizing pulses of the composite signal shown in Fig. 4A. Accordingly, there is furnished a reliable and accurate source of synchronizing information. However, for the case where the form of synchronizing information shown in Fig. 4G is preferred, the output of tube V3 is applied by way of a differentiating network comprising the capacitance 106 and resistance 107 to the control grid of the amplifier tube V4 which is operated to respond only to positive input pulses. This clipping action can be achieved by properly biasing the control grid with respect to the potential source or battery 108. Thereafter the series of negative pulses derived on the plate of tube V4 are applied to the control grid of the tube V5 which is operated as a pulse stretcher. Pulse stretching is accomplished by charging the stray capacitance $C_s$ across the output terminals 110 through tube V5 and by making the discharge path of this stray capacitance the high resistance 111. There is then derived an output which has the wave form shown in Fig. 4G where the vertical synchronizing pulse output rises sharply and precisely at the end of the first vertical pulse serration allowing ample time for the return of the vertical sweep trace which has been at the opposite end of the screen.

It is to be understood that the specific arrangement described is merely illustrative of the general principles of the invention. Various other forms of filters, subtractors, clippers, differentiators, and pulse stretchers may be suitable in the construction of a vertical synchronizing separator within the scope of the present invention. Additionally, it is possible to simplify the circuitry by making some of the circuit elements do double duty, a consideration which has been disregarded in this particular arrangement in order to achieve a more orderly exposition of the principles of the invention.

What is claimed is:

1. A synchronizing separator for deriving vertical synchronizing pulses for a television receiver comprising an input source of a composite synchronizing signal including a first series of pulses recurrent at the line television frequency and a second series of longer serrated pulses recurrent at the television field frequency, low pass filter means having its upper cut-off frequency below the line frequency and above the field frequency, subtracting means supplied with the composite signal and the filter output for deriving a difference signal, and clipping means supplied with said difference signal for deriving a series of vertical synchronizing pulses.

2. A synchronizing separator for deriving vertical synchronization pulses for a television receiver comprising an input source of a composite synchronizing signal including a first series of pulses recurrent at the television line frequency and a second series of longer serrated pulses recurrent at the television field frequency, low pass filter means having its upper cut-off frequency below the line frequency and above the field frequency supplied with said composite signal for effecting a displacement in amplitude level between the first and second series, subtracting means for obtaining the difference between the filter output and composite signal, clipping means supplied with said difference for deriving a third series of pulses characteristic of the second series of pulses, differentiating means for providing a series of negative and positive pulses coinciding with the edges of said third series of pulses, and means utilizing the pulses of a particular polarity of said last-mentioned series for providing a vertical synchronizing signal.

ROBERT E. GRAHAM.
CHARLES W. HARRISON.

References Cited in the file of this patent

UNITED STATES PATENTS

| Number | Name | Date |
| --- | --- | --- |
| 2,292,148 | Moe | Aug. 4, 1942 |
| 2,511,146 | Beste | June 13, 1950 |
| 2,521,504 | Dome | Sept. 5, 1950 |